(12) United States Patent
Meyer et al.

(10) Patent No.: US 8,088,984 B2
(45) Date of Patent: Jan. 3, 2012

(54) CONVERTIBLE PERCUSSION CART-PLATFORM SYSTEM

(75) Inventors: Dennis R. Meyer, Owatonna, MN (US); Matthew W. Loftus, Owatonna, MN (US); Mark E. Gallea, Waseca, MN (US); Aaron Harris, Owatonna, MN (US); Craig J. Ulrich, Owatonna, MN (US); Michael D. Jines, Northfield, MN (US)

(73) Assignee: Wenger Corporation, Owatonna, MN (US)

( * ) Notice: Subject to any disclaimer, the term of this patent is extended or adjusted under 35 U.S.C. 154(b) by 77 days.

(21) Appl. No.: 12/571,860

(22) Filed: Oct. 1, 2009

(65) Prior Publication Data
US 2010/0077904 A1   Apr. 1, 2010

Related U.S. Application Data

(60) Provisional application No. 61/101,891, filed on Oct. 1, 2008.

(51) Int. Cl.
*G10D 3/00* (2006.01)
(52) U.S. Cl. ........................................................ 84/421
(58) Field of Classification Search ............... 84/411 R, 84/420, 421; 248/177.1, 439, 121, 122.1, 248/460, 165, 166
See application file for complete search history.

(56) References Cited

U.S. PATENT DOCUMENTS

| | | |
|---|---|---|
| 3,720,336 A | 3/1973 | Murray et al. |
| 4,150,630 A | 4/1979 | Pokorny et al. |
| 4,240,646 A | 12/1980 | Scott |
| 4,531,443 A | 7/1985 | Gillis, Jr. |
| 4,579,229 A | 4/1986 | Porcaro et al. |
| 4,887,836 A | 12/1989 | Simjian |
| 5,016,896 A | 5/1991 | Shafer |
| 5,392,718 A | 2/1995 | Stevens |
| 5,678,838 A | 10/1997 | Taylor |
| 5,949,008 A | 9/1999 | Augsburger |
| 6,006,680 A | 12/1999 | Quam et al. |
| 6,091,011 A | 7/2000 | Simons et al. |
| 6,113,130 A | 9/2000 | Saulce |
| 6,119,788 A | 9/2000 | Bernier |
| 6,393,769 B1 | 5/2002 | Mertik et al. |
| 6,471,078 B2 | 10/2002 | Pyle |
| 6,610,916 B1 | 8/2003 | Torrez |
| 6,659,495 B1 | 12/2003 | Sanderson |
| 6,733,026 B1 | 5/2004 | Robbverson et al. |
| 7,083,184 B2 | 8/2006 | Sawyer |
| 7,420,111 B1 * | 9/2008 | Lynch et al. .................. 84/421 |
| 7,428,762 B1 | 9/2008 | Kalies |
| 2003/0140766 A1 | 7/2003 | Izen et al. |
| 2005/0011135 A1 | 1/2005 | Hallberg |
| 2005/0069403 A1 | 3/2005 | Holman |

* cited by examiner

*Primary Examiner* — Kimberly Lockett
(74) *Attorney, Agent, or Firm* — Patterson Thuente Christensen Pedersen, P.A.

(57) ABSTRACT

A convertible percussion cart-platform system includes first and second instrument platforms that are shiftable between a transportation position and a performance position for moving and positioning musical instruments and a player platform that is shiftable between folded and unfolded positions for allowing a user to perform on instruments supported by first and second instrument platforms in the performance position.

15 Claims, 20 Drawing Sheets

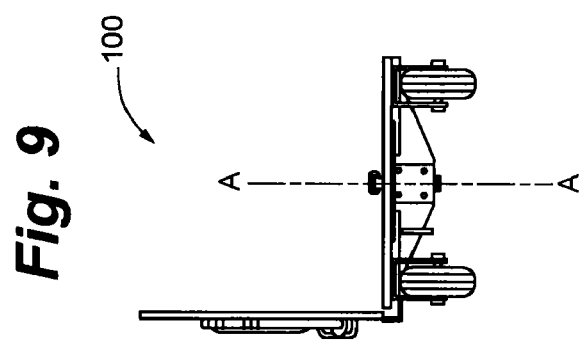
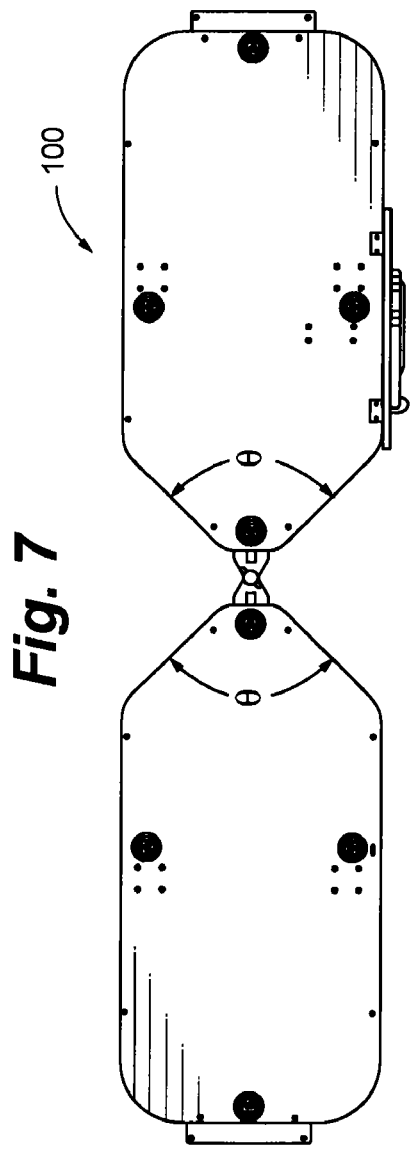
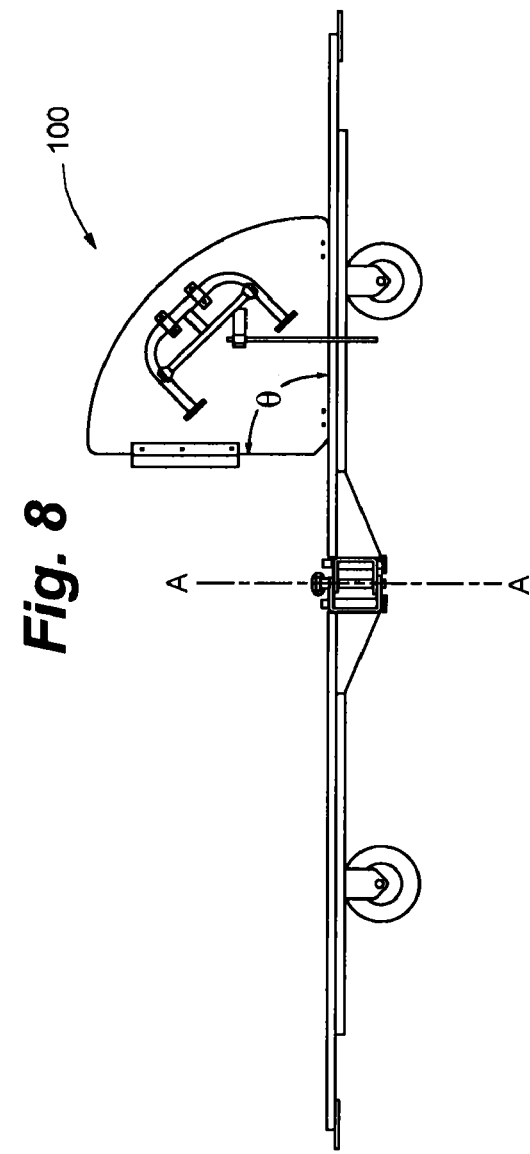

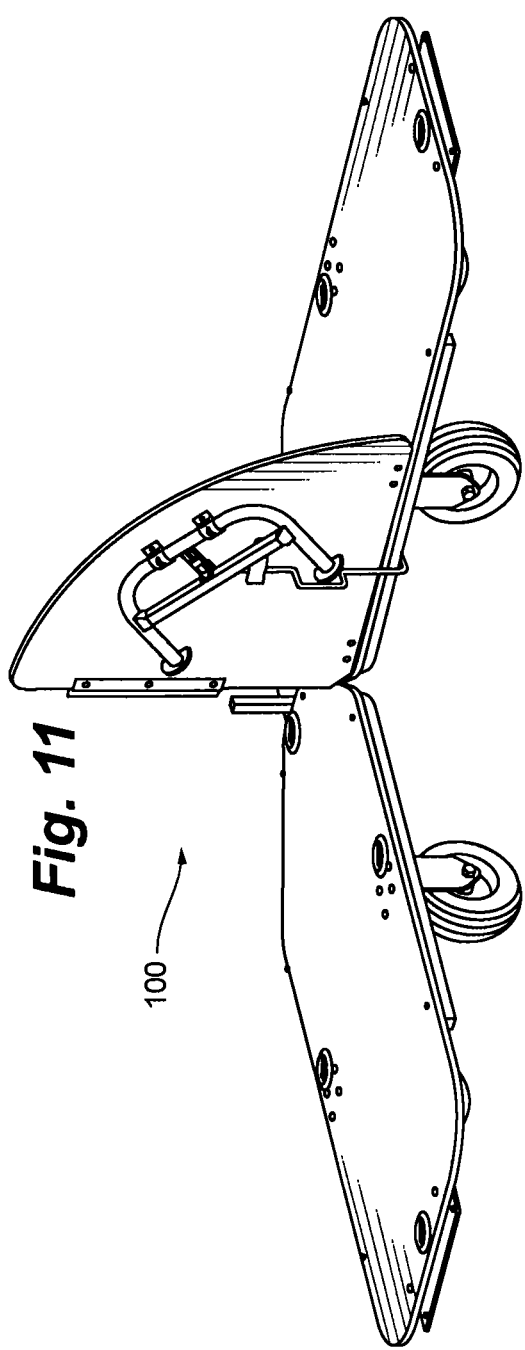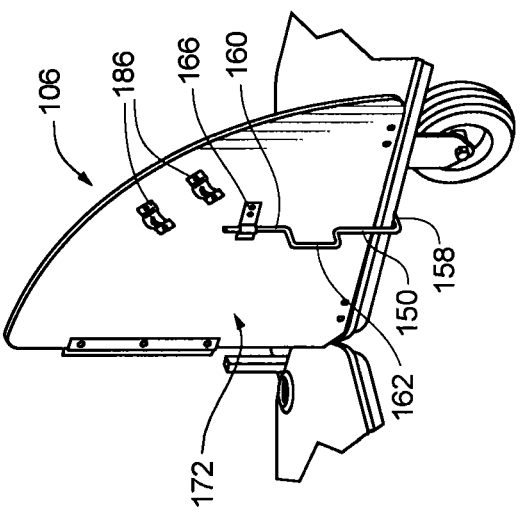

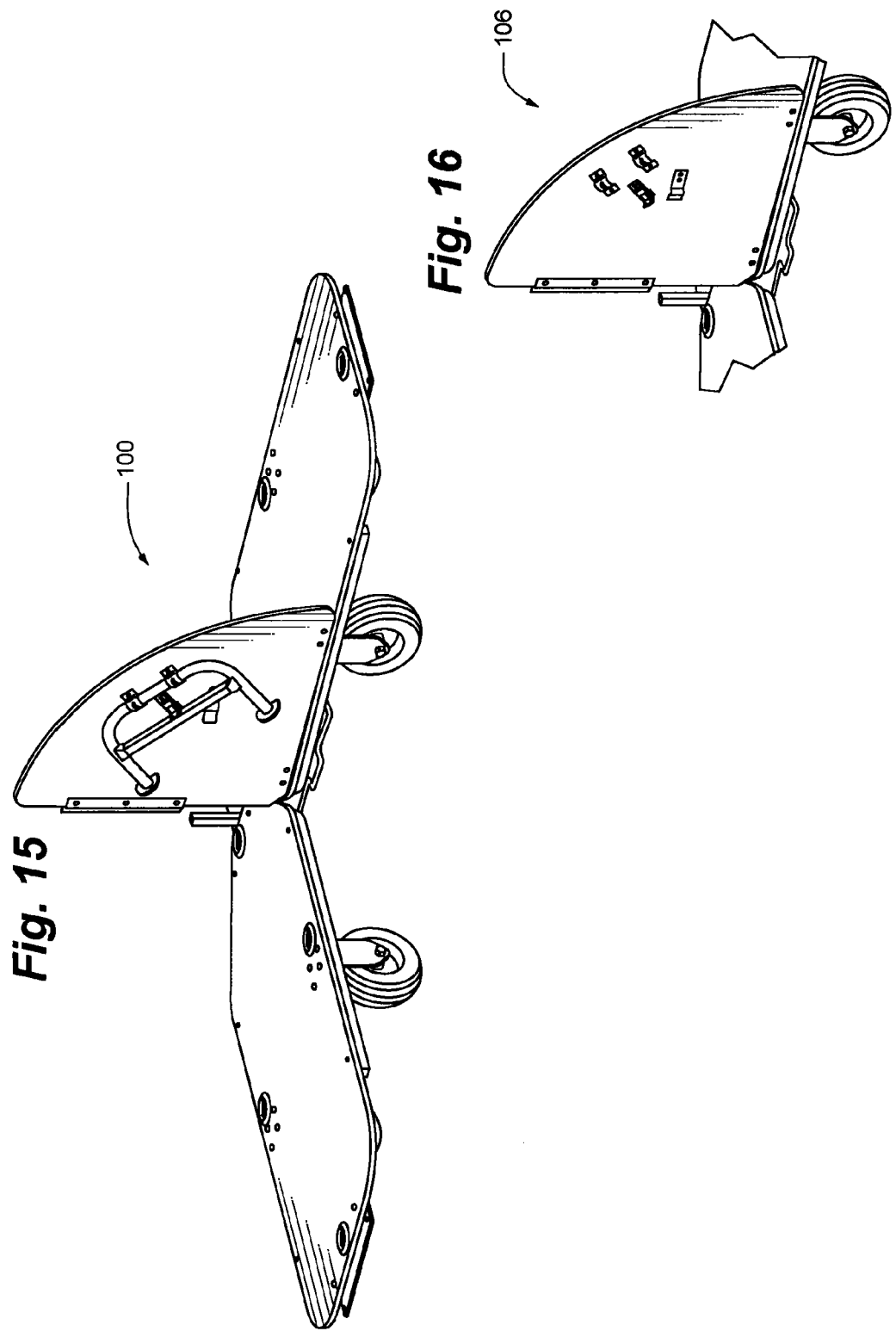

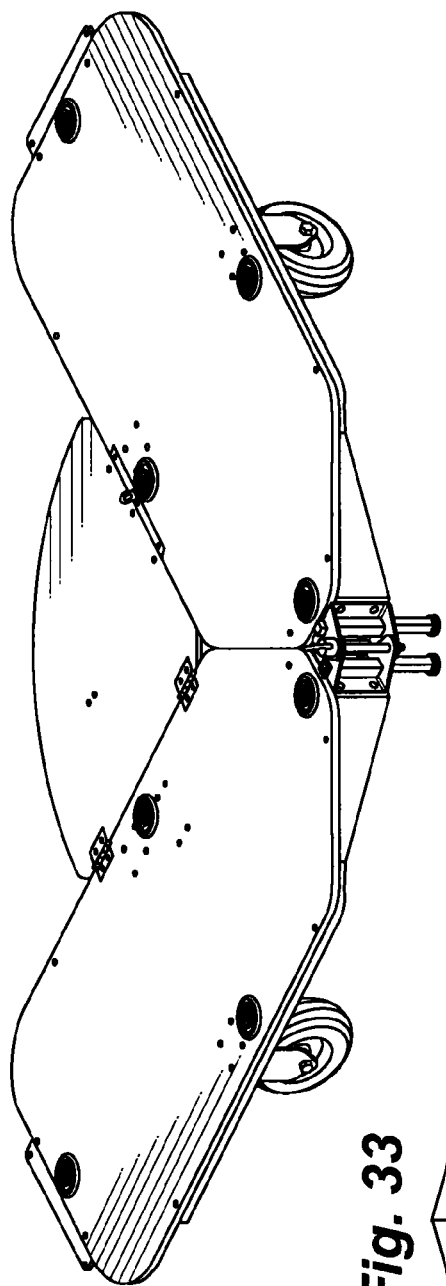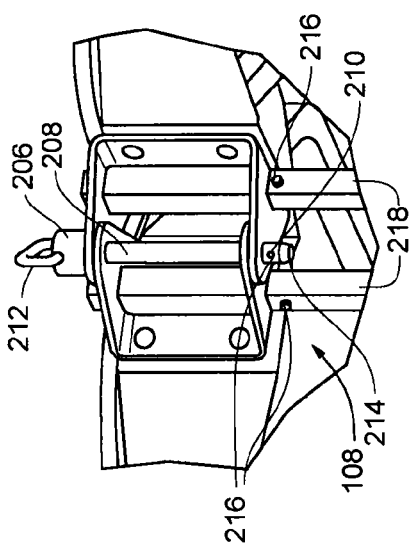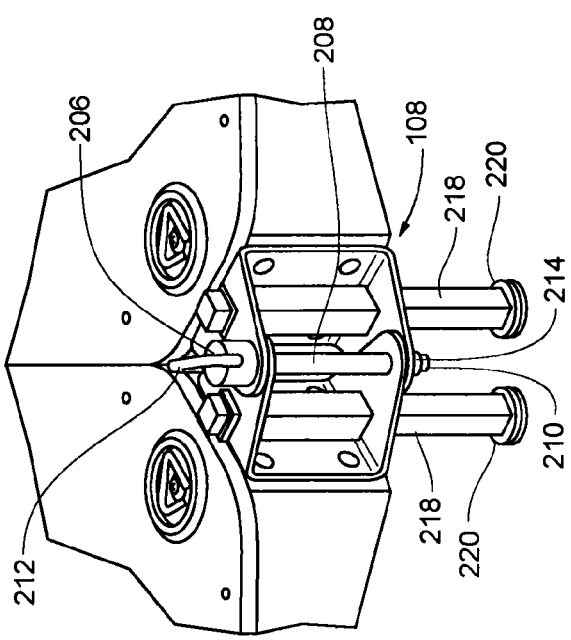

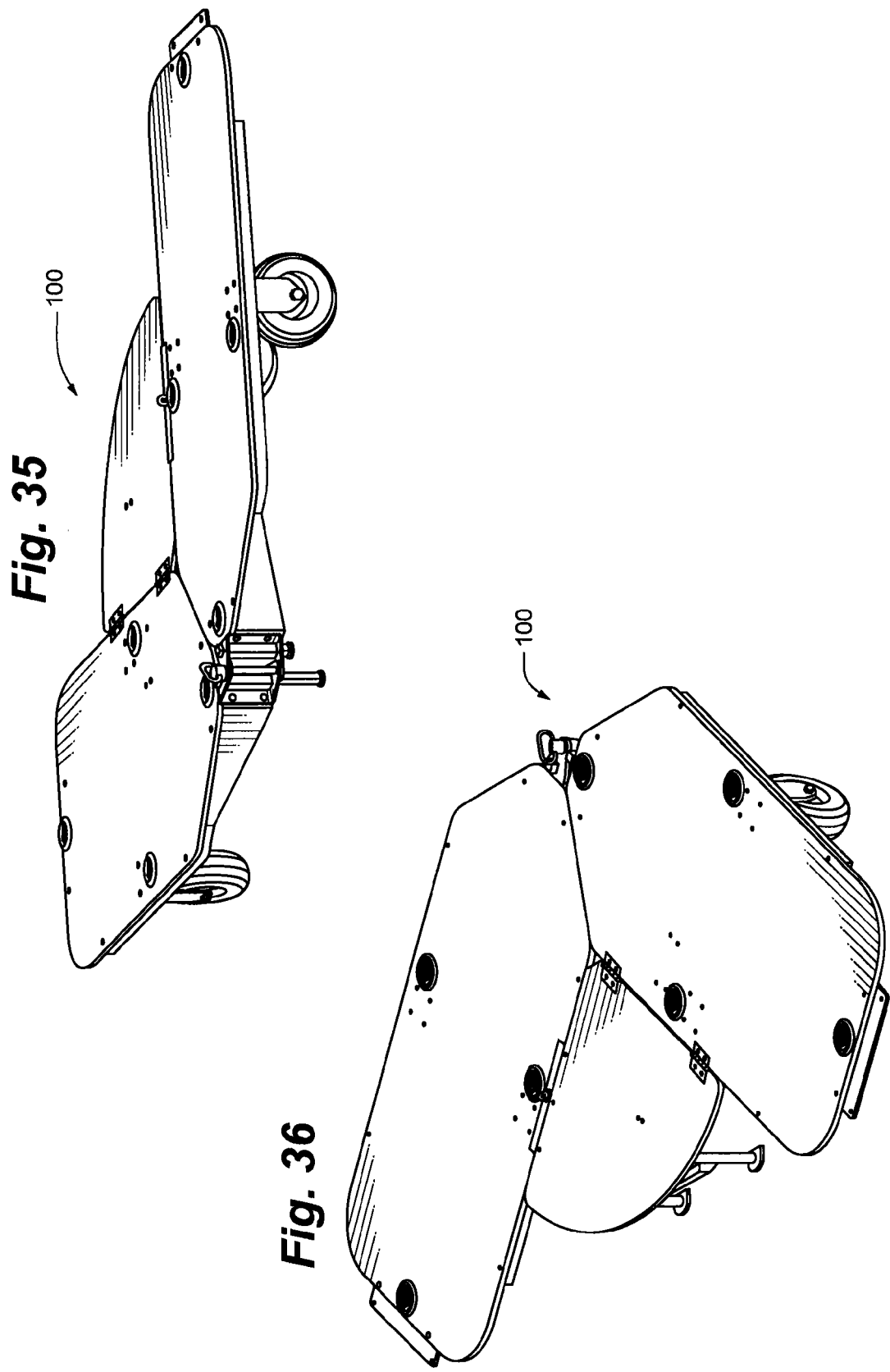

CONVERTIBLE PERCUSSION CART-PLATFORM SYSTEM

RELATED APPLICATION

The present application claims the benefit of U.S. Provisional Application No. 61/101,891 filed Oct. 1, 2008, which is incorporated herein in its entirety by reference.

FIELD OF THE INVENTION

The present invention relates generally to storing and transporting musical instruments. More particularly, the present invention relates to a convertible cart that can be used transport percussion instruments and reconfigured to place the percussion instruments into a performance-ready position.

BACKGROUND OF THE INVENTION

During performances by marching bands, musicians are often required to arrange themselves quickly into performance position. For example, performances often occur during intermission of half-time of sporting events. In such instances, the musicians must perform on the same field on which the sporting event takes places and within strictly confined time constrains and space limitations. Furthermore, such performances often require the musicians to complete complex, choreographed movements. As a result, there is a need for musicians to be able to transport themselves and their instruments to various locations within a short period of time while not significantly disrupting the ability of the musicians to perform.

Hand-held musical instruments are particularly suitable for such performances because they can be transported quickly and easily by the respective musicians. For example, band members can quickly and easily carry trumpets and trombones while entering or exiting a performance location, as well as during formation changes. Other types of instruments, however, cannot be transported or otherwise set up as easily. For example, percussion instruments are often of such a size, dimension, and weight that they cannot be carried directly by the musician. Instead, separate transportation means are required to move the instruments into place.

Current devices used to transport percussion-type instruments, such as timpanis, have a number of drawbacks. Notable among these drawbacks is that even after the instruments are transported to a particular location, additional set-up may be required before a musician can properly use the instruments during a performance. This is because the instruments are frequently configured to optimize mobility of the transportations means, rather than performance positioning, during transportation. As a result, percussion instruments like timpanis may require a significant repositioning and set-up upon arrival at the performance location. For example, it may be necessary to first remove the instruments from the vehicle used to transport them, place them on a new surface, and finally reconfigure them into relative positions that optimize the musician's ability to perform.

Such positioning may require the instruments to be removed from the transportation means and configured into a performance position directly on the performance terrain or on a separate playing stage. In either instance, a certain amount of set-up is required, during which time the instruments cannot be played and the performance may be delayed. Similarly, the required take-down required for removal of the instruments can further reduce the amount of time available for playing the particular instruments and for the performance as a whole. In addition, the positioning of the instruments onto the performance site or a separate playing stage substantially reduces the ability of the instruments to be moved during the performance. As a result, the ability of marching bands to assume new formations and perform maneuvers during performances can be further limited.

Timpanis in particular present unique set-up challenges because optimal performance positioning typically requires at least four differently sized timpanis to be positioned in a V-shape. This allows the musician to position himself or herself "inside" the V-shaped array of timpanis for quick and efficient access to each respective timpani for performance purposes. In addition, it is generally preferable that the surfaces on which the musician stands and the timpanis rest be level.

A drawback of current systems used to transport timpanis and other percussion-type instruments is the extensive set-up and take-down required for proper positioning and subsequent removal of the instruments. For example, the instruments must first be removed from the vehicle, properly positioned on the performance surface, and subsequently re-loaded onto the transport vehicle once the performance has concluded. The size and weight of most timpanis make this a physically demanding process. In addition, the frequent removal and re-loading of timpanis off of and onto the transport vehicle can increase the likelihood of damage to the timpanis, reduce the amount of time available to musicians for performing, and virtually ensure that the relative positions of the timpanis in a V-shaped orientation cannot be precisely replicated. Furthermore, unlevel surfaces can create adverse performance conditions and thereby increase the difficulty of performing and reduce the overall performance quality.

Therefore, there is a need for a convertible percussion cart-platform system that addresses the aforementioned drawbacks.

SUMMARY OF THE INVENTION

The embodiments of the present invention described herein substantially meet the aforementioned needs of the industry by providing a convertible percussion cart-platform system. The convertible cart-platform system generally includes at least two pivotably coupled instrument platforms and a player platform. Each instrument platform includes a pair of spaced-apart wheel assemblies and can support a plurality of instruments such as timpanis. The player platform is coupled to at least one of the instrument platform and can be coupled to a second instrument platform to support a user. The convertible cart-platform system generally also includes a plurality of ground-engaging legs for stabilizing the convertible cart-platform system.

The convertible cart-platform system can be used for any number of purposes, but can be particularly effective in transporting timpanis and facilitating their positioning into respective positions for a musician. The convertible cart-platform system, however, may be adapted to accommodate a varying mix of instruments and instrument sizes. In an embodiment, the convertible cart-platform system is convertible between a transportation position and a performance position. In the transportation position, the instrument platforms of the convertible cart-platform system are substantially linearly aligned to facilitate transportation and the player platform. In the performance position, the instrument platforms of the convertible cart-platform system are configured to facilitate assisted movement of the convertible percussion cart-platform system and the player platform is folded and secured in a substantially horizontal position.

A feature and advantage of the present invention is the ability of a single user to reversibly configure the convertible percussion cart-platform system between the transportation position and the performance position without the need to remove the instruments from the instrument platforms. Risk of damage to the instruments is thereby reduced and additional time can be saved for actual performance, rather than set-up and removal, by the musician. In addition, the instruments can be repeatedly positioned into a consistent V-shaped orientation for improved performance by the musician. Various features of the convertible cart-platform system can also be adjusted to provide added stability on uneven terrain and maintain the convertible percussion cart-platform system substantially immobile and substantially level when in a performance position.

Further embodiments of the present invention also include methods of transporting musical instruments, positioning musical instruments into a performance position, assembling a convertible percussion cart-platform system, transporting musical instruments, and providing instructions for assembling a convertible percussion cart-platform system as described above.

BRIEF DESCRIPTION OF THE DRAWINGS

The embodiments of the present invention may be more completely understood in consideration of the following detailed description of various embodiments in connection with the accompanying drawings, in which:

FIG. 7 is a top plan view of a convertible percussion cart-platform system according to an embodiment of the present invention in a transportation position;

FIG. 8 is a front elevation view of a convertible percussion cart-platform system according to an embodiment of the present invention in a transportation position;

FIG. 9 is a side elevation view of a convertible percussion cart-platform system according to an embodiment of the present invention in a transportation position;

FIG. 11 is a front perspective view of a convertible percussion cart-platform system according to an embodiment of the present invention in an intermediate position;

FIG. 12 is a partial front perspective view of a portion of a player platform of a convertible cart-platform system according to an embodiment of the present invention;

FIG. 15 is a front perspective view of a convertible percussion cart-platform system according to an embodiment of the present invention in an intermediate position;

FIG. 16 is a partial front perspective view of a portion of a player platform of a convertible cart-platform system according to an embodiment of the present invention;

FIG. 32 is a rear perspective view of a convertible percussion cart-platform system according to an embodiment of the present invention in a performance position;

FIG. 33 is a perspective view of a swivel joint of a convertible percussion cart-platform system according to an embodiment of the present invention;

FIG. 34 is a perspective view of a swivel joint of a convertible percussion cart-platform system according to an embodiment of the present invention;

FIG. 35 is rear perspective view of a convertible percussion cart-platform system according to an embodiment of the present invention in a performance position; and FIG. 36 is a side perspective view of a convertible percussion cart-platform system according to an embodiment of the present invention in a performance position.

Figure 1:
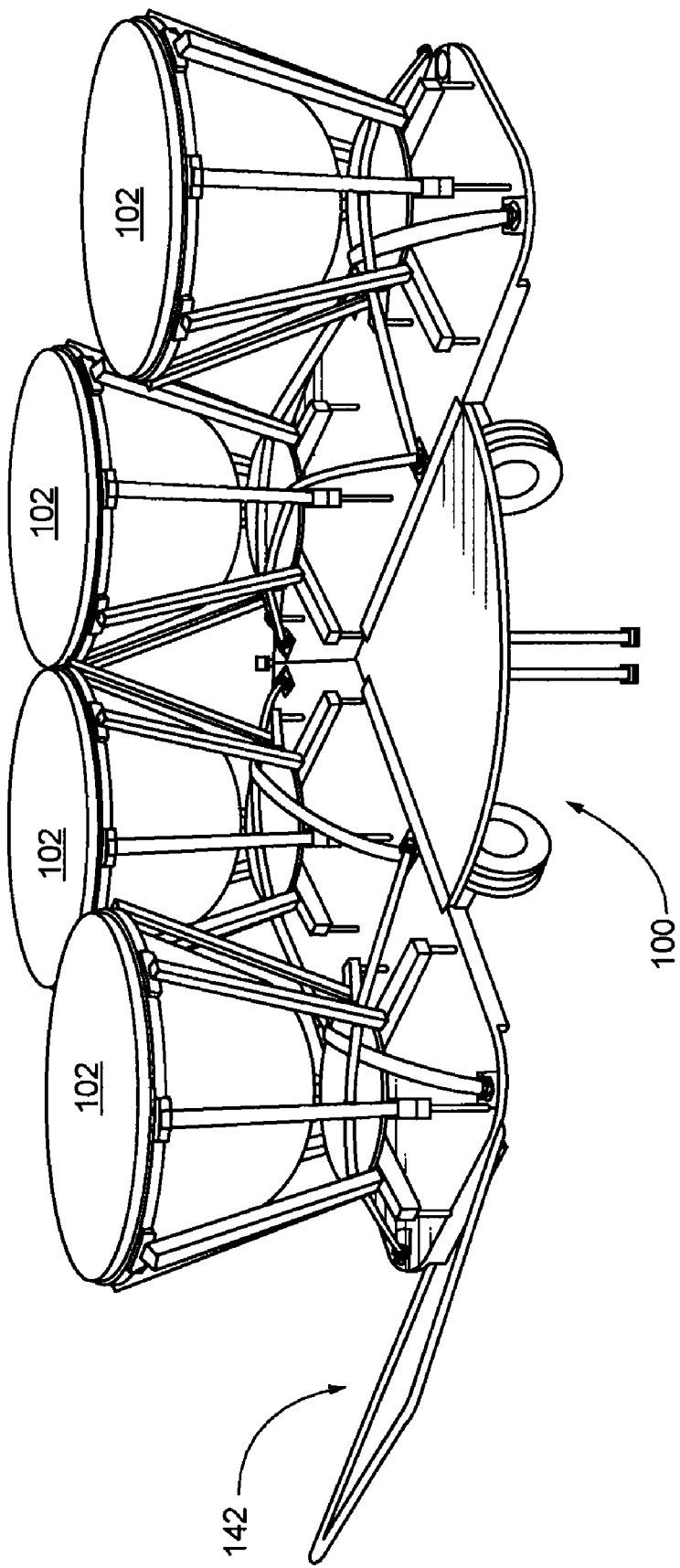
FIG. 1 is a front perspective view of a convertible percussion cart-platform system according to an embodiment of the present invention in a performance position with timpani positioned thereon.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Figure 2:
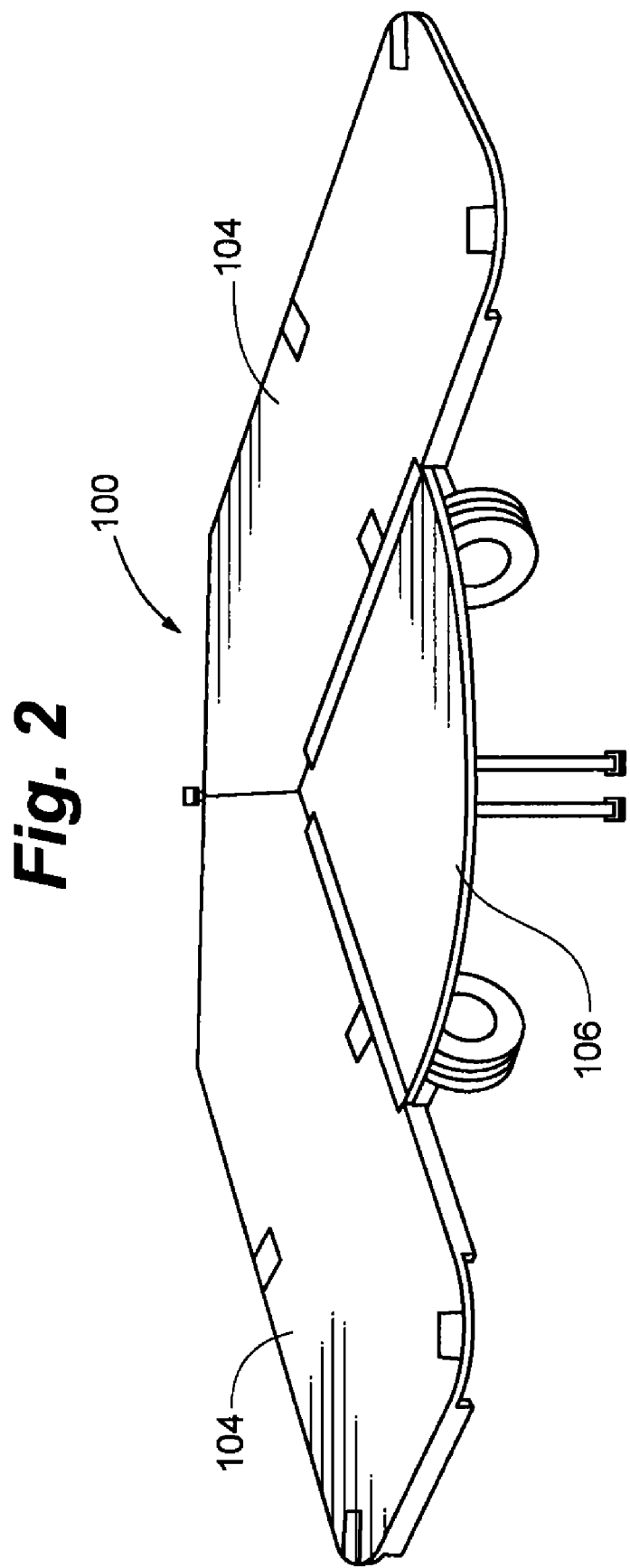
FIG. 2 is a front perspective view of a convertible percussion cart-platform system according to an embodiment of the present invention in a performance position.
Figure 3:
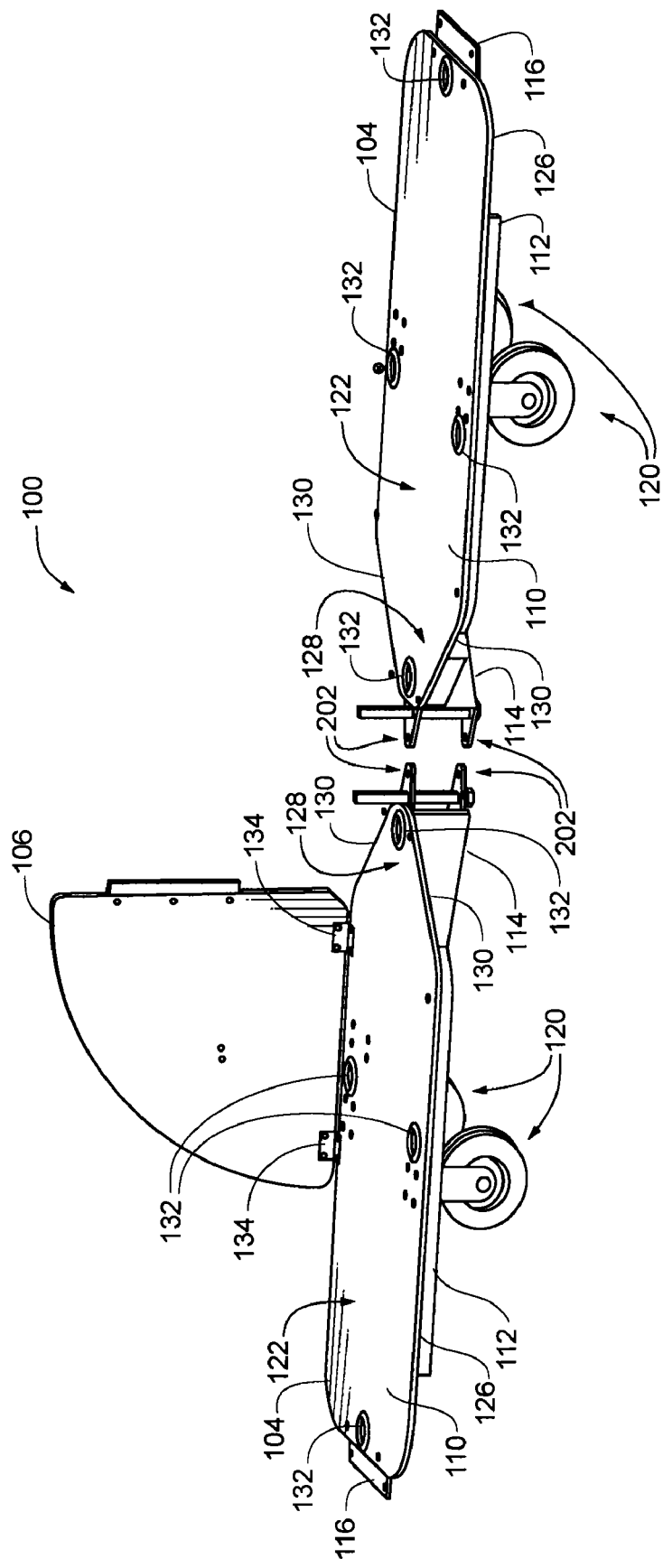
FIG. 3 is a partially exploded rear perspective view of a convertible percussion cart-platform system according to an embodiment of the present invention in a transportation position.

A convertible percussion cart-platform system is depicted generally in FIGS. 1-2 with reference numeral 100. Although convertible cart-platform system 100 can be used for any number of purposes without departing from the spirit or scope of the present invention, convertible cart-platform system is useful in transporting and positioning musical instruments, such as, for example, timpani 102 and other types of percussion instruments 102. One skilled in the art will readily recognize that convertible cart-platform system 100 may be modified to accommodate many other types of musical instruments, as well as objects other than musical instruments.

Convertible percussion cart-platform system 100 generally comprises at least two instrument platforms 104, player platform 106, and swivel joint assembly 108. Although FIGS. 1-36 and this disclosure generally depict and/or describe embodiments of the present invention having two instrument platform 104 and one player platform 106, the present invention may be adapted to include three or more instrument platform 104 or two more player platforms 104. In addition, though instrument platform 104 are generally depicted in FIGS. 1-36 as having similar dimensions, instrument platform 104 may be adapted to have different dimensions, including sizes and shapes other than those depicted in the figures.

Instrument platform 104 may include deck portions 110, deck frame 112, collar 114, hitch 116, latch 118, and wheel assemblies 120. Deck portions 110 generally is substantially planar and presents upper deck surface 122, lower deck surface 124, and deck edge 126. Each deck portions 110 generally has tapered end 128, as depicted in FIGS. 3-7, 10-11, 13-15, 17-21, 24-27, 29, 32, and 35-36. Tapered end can be formed by at least two tapering edges 130 forming angle θ, as depicted in FIG. 7. Angle θ is generally between approximately thirty degrees and sixty degrees, one skilled in the art will readily recognized that angle θ of tapered end 128 may be outside this range without departing from the spirit or scope of the present invention. In an embodiment, angle θ is approximately forty-five degrees.

Deck portions 110 can be made from any number of materials. For example, deck portions 110 could be made from a polymer or a metal. In an embodiment, deck portion 110 is made from plywood with a non-skid surface. The thickness of deck portion 110 may be between approximately ¼ inch and several inches. In an embodiment, deck portion 110 is approximately ¾ inch thick. Deck portion 110 generally has dimensions so that deck portion 110 can accommodate at least two timpani-type percussion instruments 102. In an embodiment, each deck portion 110 is approximately 75 inches long and can accommodate timpani-type percussion instruments 102 of multiple sizes, such as, for examples, timpani having a diameter of 20 inches, 23 inches, 26 inches, 29 inches, or 32 inches. Deck portion 110 generally has dimensions so that convertible cart-platform system 100 is able to pass through a 38-inch door opening. Deck portion 110 may, however, be wider than 38 inches and be configured so as to accommodate fewer than two timpani-type percussion instruments 102. In an embodiment, deck portion 110 is approximately 34¼ inches wide.

Upper deck surface 122 may include fastening means to facilitate securing of timpani type percussion instruments 102 to deck portion 110. In an embodiment, fastening means are tie-down rings 132, as generally depicted in FIGS. 3-36. Upper deck surface 122 may also include hinge 134 and locking member 136. Lower deck surface 124 generally presents a mounting surface for deck frame 112, collar 114, hitch 116, latch 118, and wheel assemblies 120. Although not depicted in the figures, one skilled in the art will readily recognize that convertible percussion cart-platform system 100 may be adapted such that lower deck surface 124 includes fastening means and upper deck surface 122 includes deck frame 112, collar 114, or latch 118.

Deck frame 112 is generally positioned proximal to deck edge 126 and can provide structural stability to deck portion 110. Deck frame 112 may extend along all or a portion of deck edge 126. In an embodiment, lower deck surface 124 has at least two deck frames 112 that extend along portions of deck edge 126, as depicted in FIGS. 17, 24-27, and 29.

Collar 114 may extend downward from lower deck surface 122 proximal to tapered ends 128. Collar 114 generally has mounting plate 138 and buttressing plates 140. Mounting plate 138 is adapted to receive a portion of swivel joint assembly 108 and buttressing plates 140 are adapted to facilitate positioning of instrument platform 104.

Hitch 116 may be any number of components adapted to receive a device to facilitate transportation of convertible cart-platform system 100. In an embodiment, hitch 116 is a plate adapted to receive a towing device 142, such as, for example, an elongated tow-handle as depicted in FIG. 1. In other embodiments, hitch 116 is a component adapted to operably connect to a vehicle such as, for example, a trailer, semi-trailer, or truck. Such hitch 116 may be, for example, a typical ball-and-socket hitch 116.

Wheel assemblies 120 generally include mounting structure 144 and tire 146. Any number of wheel assemblies 120 can be mounted on lower deck surface 124 of deck portion 110. In an embodiment, two wheel assemblies 120 are mounted to lower deck surface 124. In accordance with this embodiment, each wheel assembly is mounted proximal to and equidistant from deck edge 126 on opposite sides of deck portion 110. Convertible percussion cart-platform system 100 can also be adapted so that more than two wheel assemblies 120 are mounted to lower deck surface 124. In an embodiment, wheel assemblies 120 are positioned such that tires 146 are substantially aligned when deck portion 110 are linearly positioned, as depicted in FIGS. 3-9. In embodiment, wheel assemblies 120 are attached to deck portion 110 such that the orientation of tires 146 is fixed relative to deck portion 110. In another embodiment, wheel assemblies 120 include a swivel mechanism such that when wheel assemblies 120 are attached to deck portion 110, tires 146 are rotatable about an axis substantially perpendicular to deck portion 110. Dimensions of wheel assemblies 120 can be varied so that a desired height of convertible percussion cart-platform system 100 can be achieved. In an embodiment, wheel assemblies 120 are selected such that height of convertible percussion cart-platform system 100 is approximately 12 inches.

Latch 118 generally includes retainer 148 and arm 150. Retainer 148 may include guide structures 152, as depicted in FIGS. 13, 17, 25, 26-27, and 29. Each guide structures 152 defines guide aperture 154 adapted to receive arm 150. In an embodiment, arm 150 has handle 156, extender 158, and brace 160. Brace 160 may also include grasper 162. Handle 156, extender 158, and brace 160 are positioned to facilitate positioning of arm 150 between bracing and stowed positions. In an embodiment, extender 158 is substantially perpendicular to handle 156 and brace 160, and handle 156 and brace 160 are substantially parallel.

Figure 18:
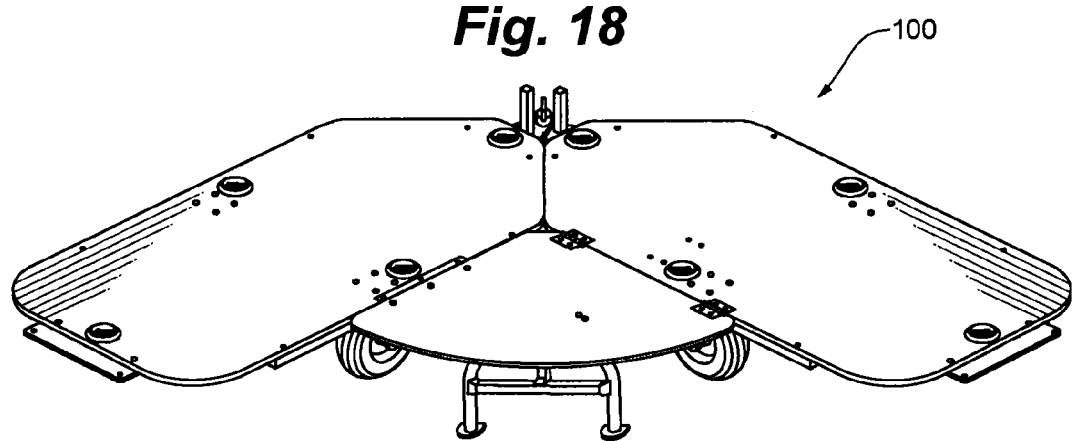
FIG. 18 is a front perspective view of a convertible percussion cart-platform system according to an embodiment of the present invention in an intermediate position.

Player platform 106 includes stage portion 164, latch bracket 166, platform stabilizer 168. Stage portion 164 is generally substantially planar and presents upper stage surface 170, lower stage surface 172, leading edges 174, and stage edge 176. Stage portion 164 is generally shaped so as to conformingly fit between two angularly oriented instrument platforms 104, as depicted in FIGS. 18-19, 21, 24-27, 29-32, and 35-36. Referring to FIG. 18, leading edges 174 form angle θ. In an embodiment, angle θ formed by leading edges 174 of player platform is substantially similar to angle θ formed by tapering edges 130 of instrument platform 104. Stage portion 164 may present one or more stage edges 176.

Figure 19:
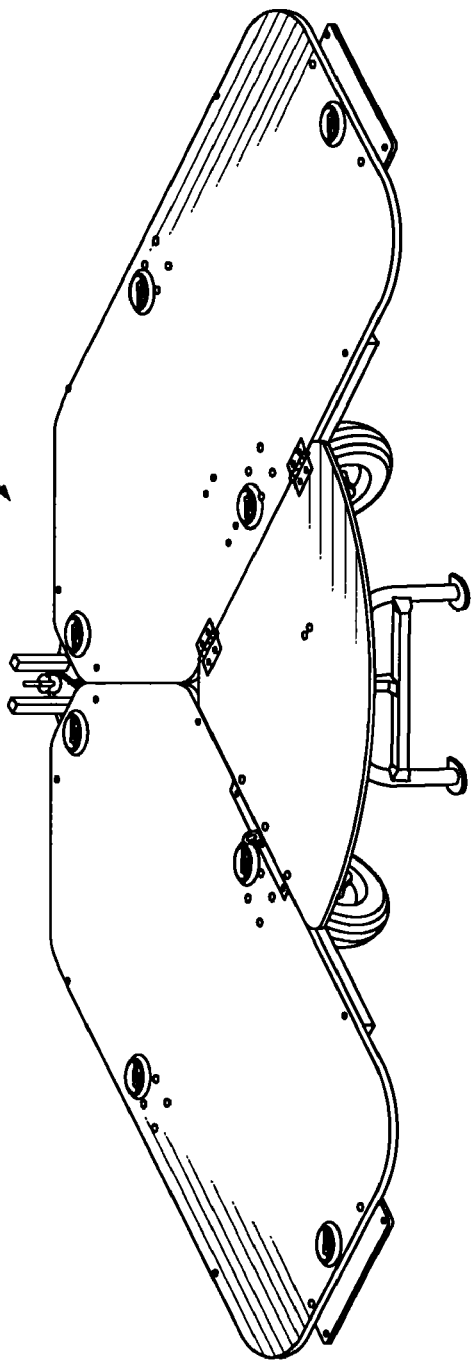
FIG. 19 is a front perspective view of a convertible percussion cart-platform system according to an embodiment of the present invention in an intermediate position.
Figure 20:
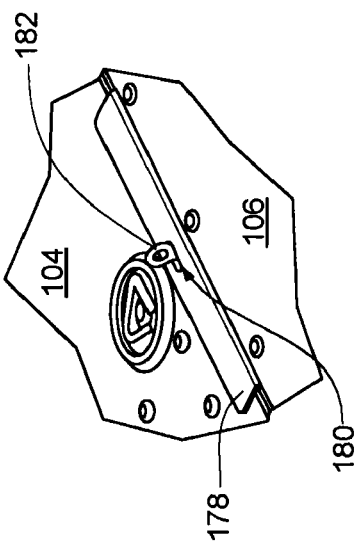
FIG. 20 is a partial perspective view of a portion of an instrument platform 104 of a convertible percussion cart-platform system according to an embodiment of the present invention.
Figure 21:
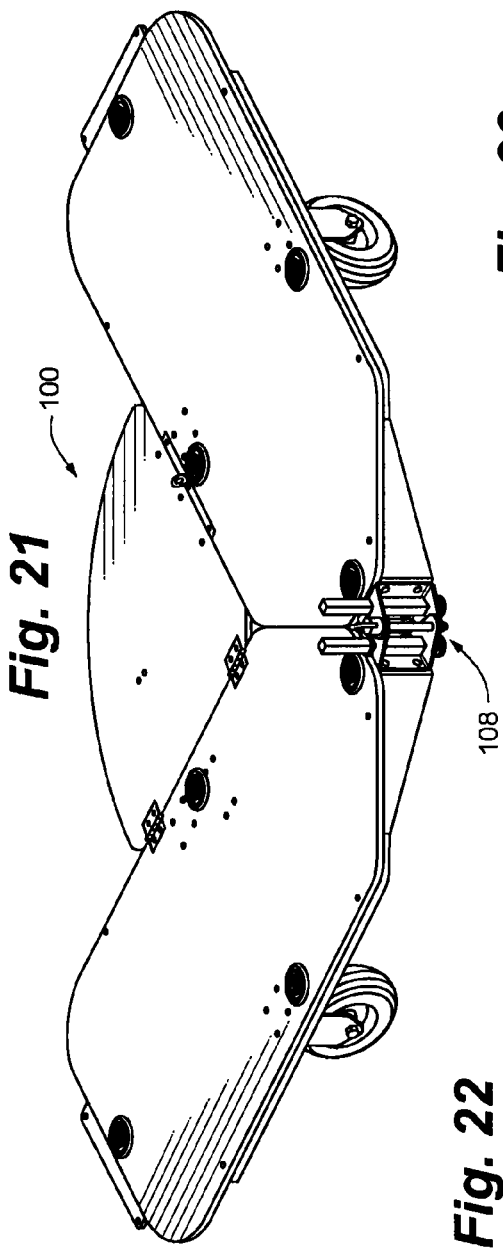
FIG. 21 is a front perspective view of a convertible percussion cart-platform system according to an embodiment of the present invention in a performance position.
Figure 23:
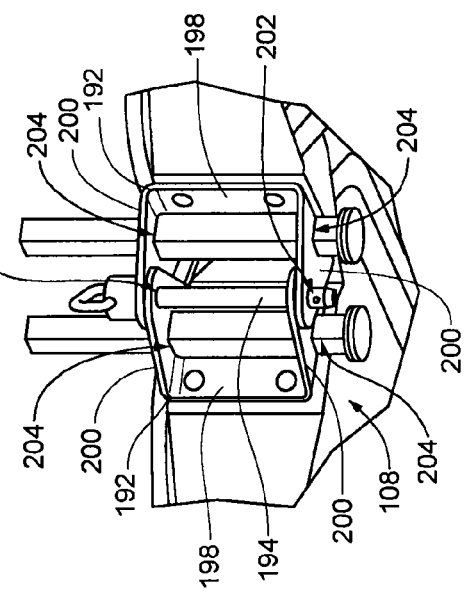
FIG. 23 is a perspective view of a swivel joint assembly 108 of a convertible percussion cart-platform system according to an embodiment of the present invention.
Figure 22:
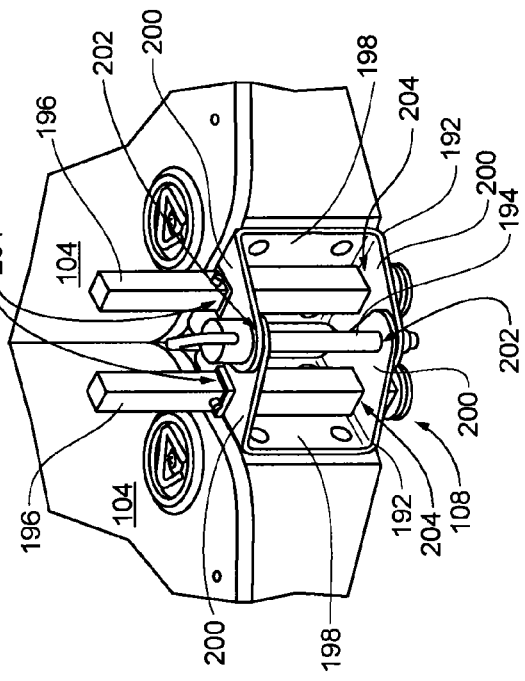
FIG. 22 is a perspective view of a swivel joint assembly 108 of a convertible percussion cart-platform system according to an embodiment of the present invention.
Figure 25:
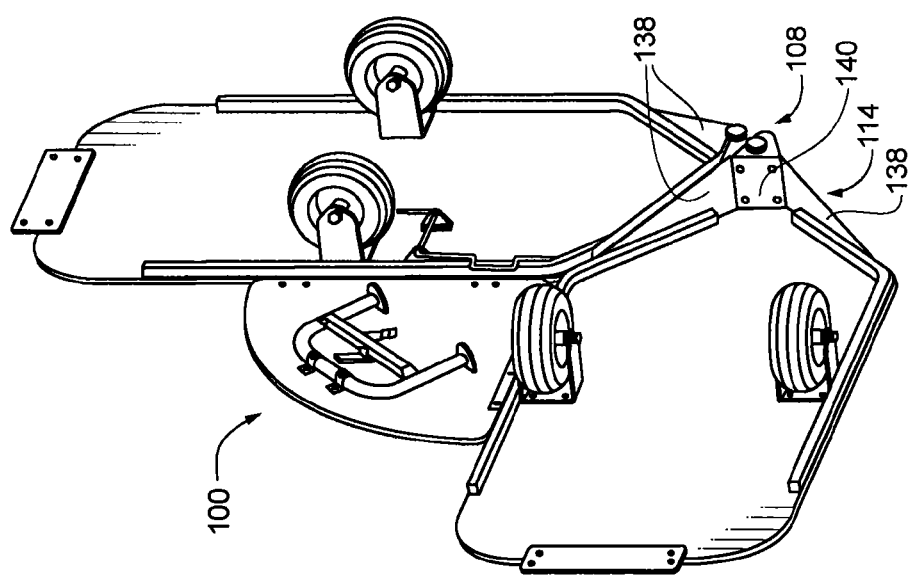
FIG. 25 is a bottom perspective view of a convertible percussion cart-platform system according to an embodiment of the present invention in a performance position.
Figure 24:
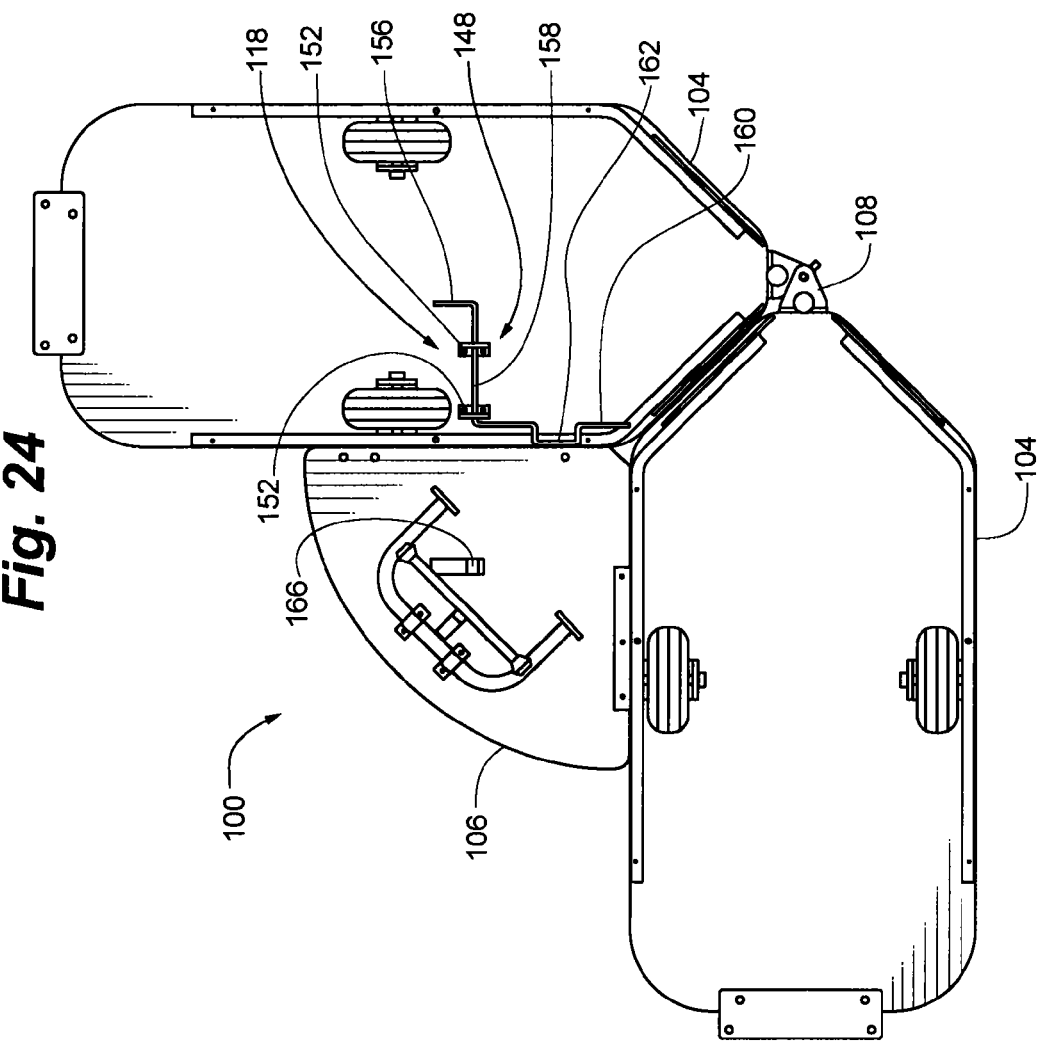
FIG. 24 is a bottom plan view of a convertible percussion cart-platform system according to an embodiment of the present invention in a performance position.
Figure 27:
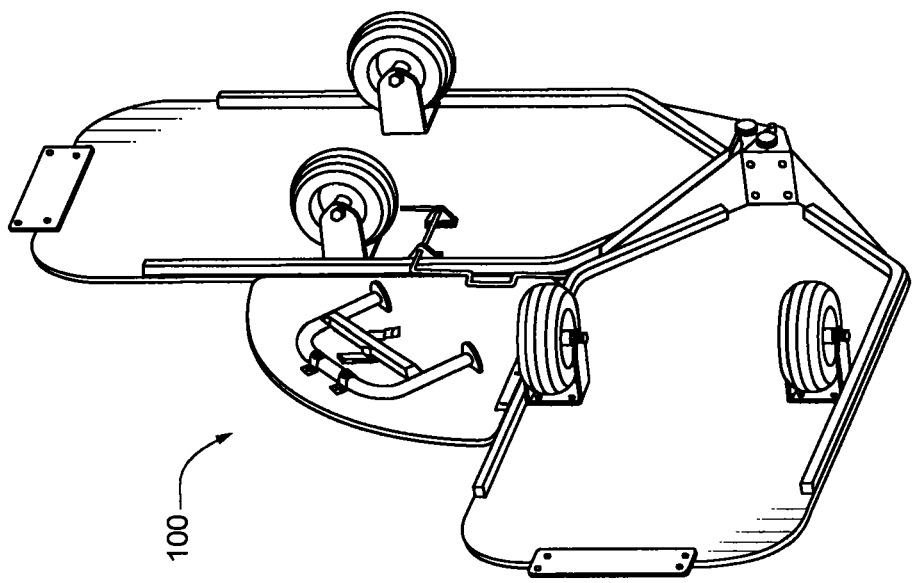
FIG. 27 is a bottom perspective view of a convertible percussion cart-platform system according to an embodiment of the present invention in a performance position.
Figure 26:
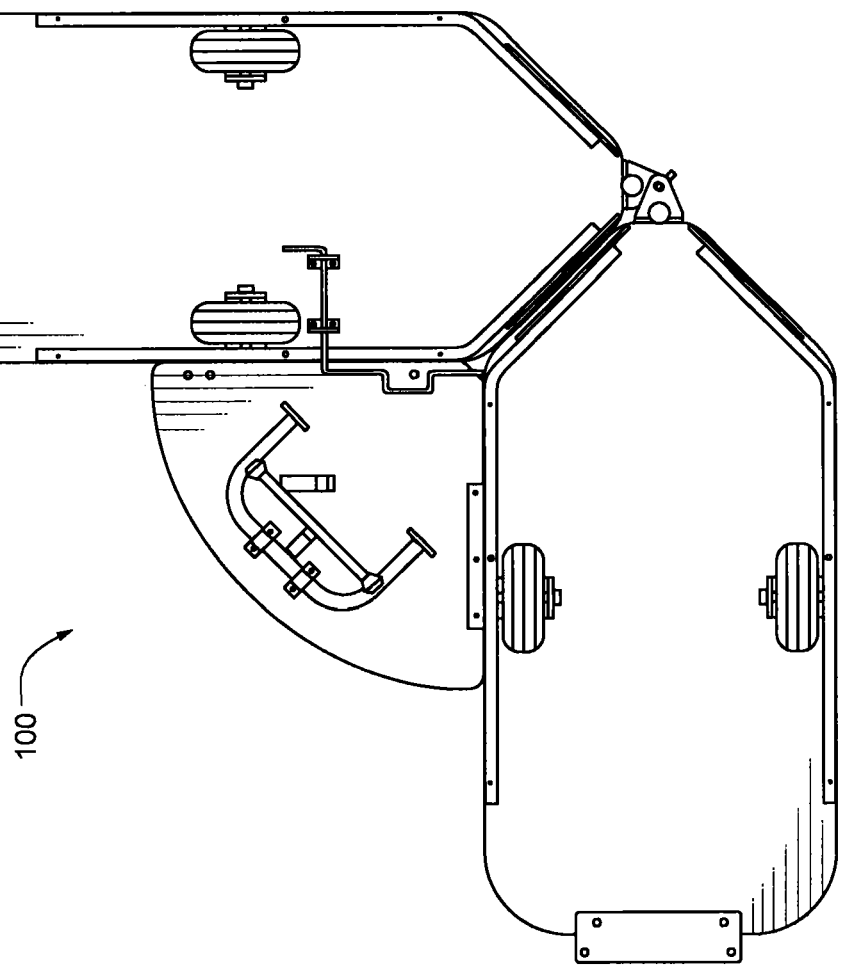
FIG. 26 is a bottom plan view of a convertible percussion cart-platform system according to an embodiment of the present invention in a performance position.
Figure 28:
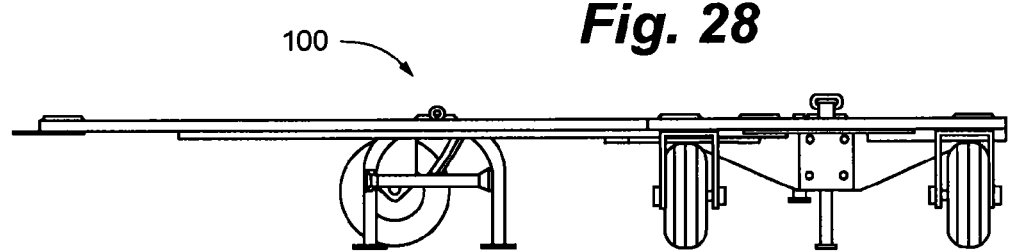
FIG. 28 is a side elevation view of a convertible percussion cart-platform system according to an embodiment of the present invention in a performance position.
Figure 29:
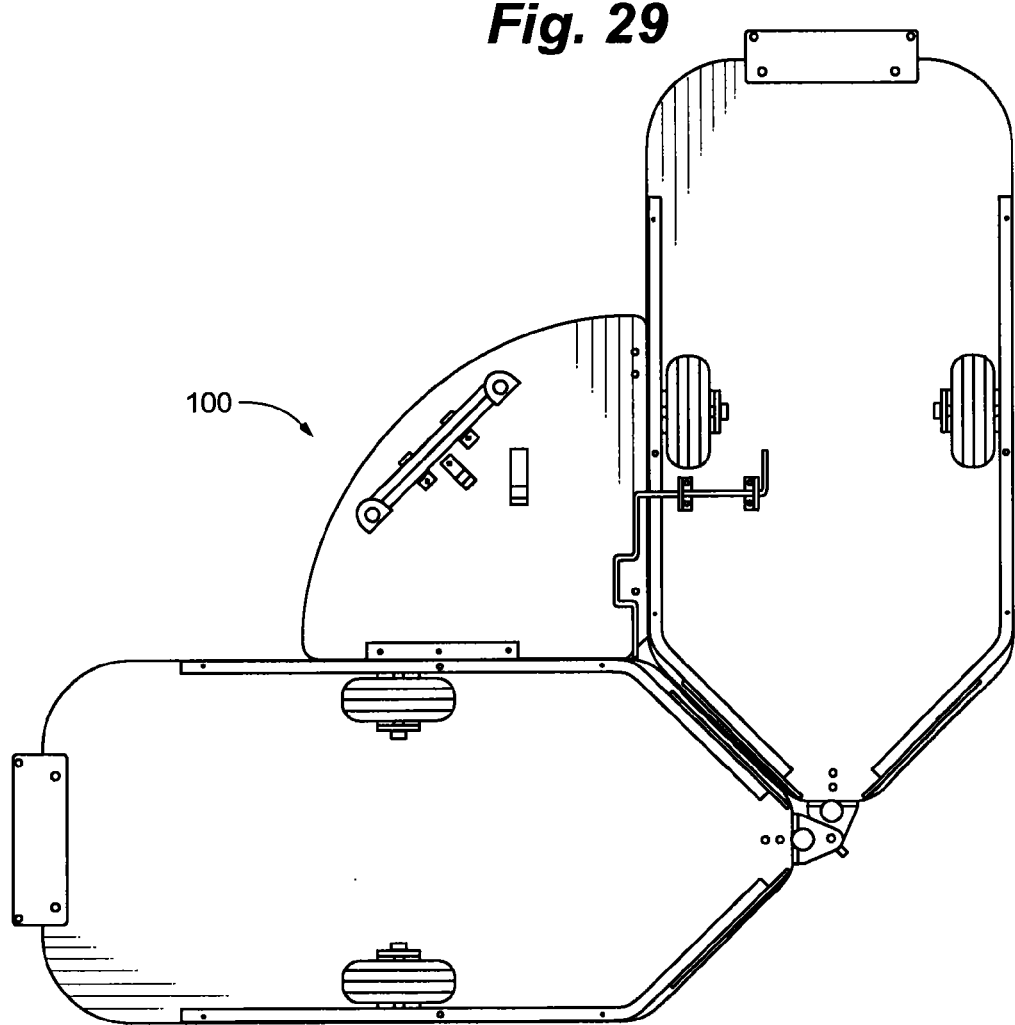
FIG. 29 is bottom plan view of a convertible percussion cart-platform system according to an embodiment of the present invention in a performance position.
Figure 31:
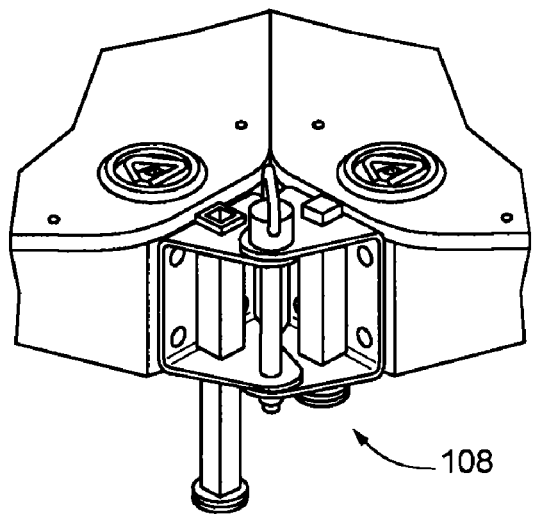
FIG. 31 is a perspective view of a swivel joint assembly 108 of a convertible percussion cart-platform system according to an embodiment of the present invention.
Figure 30:
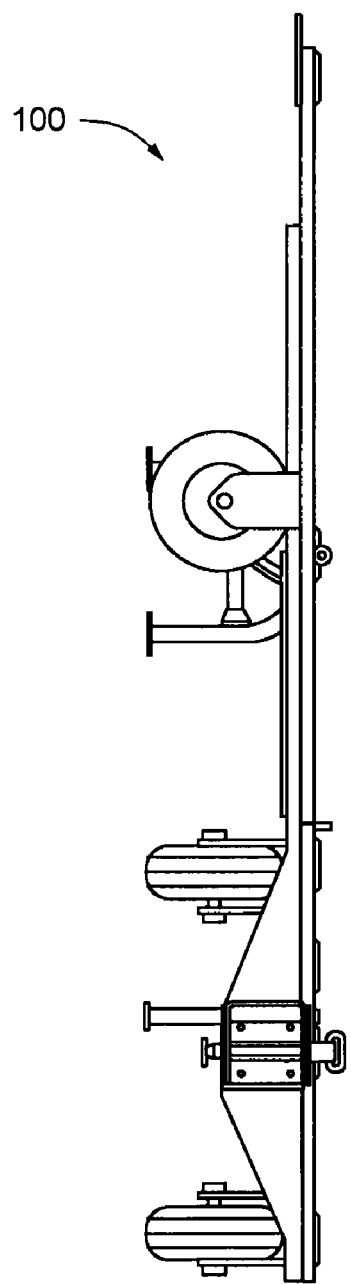
FIG. 30 is a side elevation view of a convertible percussion cart-platform system according to an embodiment of the present invention in a performance position.

In an embodiment, player platform 106 is hingedly attached to at least one instrument platform 104 with hinges 176. In an embodiment, player platform 104 can be removably secured to a second instrument platform 104 with a securing mechanism. The securing mechanism may be any number of locking means adapted to retain player platform in position in relation to instrument platform. In embodiment, securing mechanism is a securing plate 178 defining a slit 180 adapted to receive rotatable keeper 182 as depicted in FIGS. 19-20. Generally, securing plate 178 is disposed to player platform 106 and keeper 182 is disposed to instrument platform 104 such that keeper 182 receives securing plate 178 through slit 180 when player platform 106 is folded from a vertical position into a horizontal position. Latch bracket 166 is adapted to receive and retain arm 150 of latch 118, as depicted in FIGS. 6, 8, and 10-13.

Platform stabilizer 168 is generally adapted to distribute additional weight borne by player platform 106 the performance location, such as a stage or athletic field. Platform stabilizer 168 generally includes support legs 184 and may also include support brackets 186. Support legs 184 are positionable to extend substantially perpendicular to lower stage surface 172 and may be operably connected by cross bar 188. Cross bar 188 may be rotatably secured to lower stage surface 172 by support brackets 190. In an embodiment, support legs 184 and cross bar 188 forms a substantially U-shaped platform stabilizer 168 and can be rotated so as to substantially extend between lower stage surface 172 and the terrain of the performance location.

Swivel joint assembly 108 generally connects instrument platform 104, as depicted in FIGS. 31-34. Swivel assembly joint 108 defines pivot axis A-A about which instrument platform 104 can be rotated such that deck portions 110 substantially remain in the same plane, as depicted in FIGS. 8-9. In an embodiment, swivel joint assembly 108 generally has pivot brackets 192, pivot pin 194, and pivot stabilizers 196. Each pivot bracket 192 has mounting plate 198 and linking plates 200. Mounting plate 198 is adapted to be mounted to mounting plate 138 of collar 114. Each linking plate 200 defines pin aperture 202 and stabilizer aperture 204. Pin apertures 202 can be aligned so as receive pivot pin 194. Stabilizer apertures 204 can similarly be aligned so as to receive pivot stabilizers 196. Pin apertures 202 are generally sized and configured to conformingly receive pivot pin 194 while permitting rotation, insertion, and removal of pivot pin 194. Stabilizer apertures 204 are generally sized and configured to conformingly receive pivot stabilizers 196.

Pivot pin 194 generally includes top portion 206, middle portion 208, and bottom portion 210, as depicted in FIGS. 33-34. Top portion 206 is configured so that top portion 206 of pivot pin 194 cannot entirely pass through pin apertures 202 in a downward direction. Top portion 206 may also have ring 212 to facilitate removal and insertion of pivot pin 194 from or into pin apertures 202 by a user. In an embodiment, top portion 206 has a diameter that is larger than the diameter of pin apertures 202. Middle portion 208 is configured to be received by and rotatably and removably positioned through and between pin apertures 202. Bottom portion 210 may have tapered tip 214 to facilitate insertion of pivot pin 194 through pin apertures 202. Bottom portion 210 may also have retention lock 216. In an embodiment, retention lock 216 includes spring-loaded bearings that inhibit the ability of pivot pin 194 to migrate through pivot apertures 202 in an upward direction.

Pivot stabilizer 196 generally includes leg 218 and feet 220. Leg 218 is configured to be removably positionable within stabilizer apertures 204. As with bottom portion 210 of pivot pin 195, leg 218 of pivot stabilizer 196 may include retention lock 216. In an embodiment, retention lock 216 includes spring-loaded bearings that inhibit the ability of stabilizer leg 218 to migrate through stabilizer apertures 204 in an upward direction. Feet 220 are generally adapted to increase the surface area of swivel joint assembly 108 presented over performance location.

In operation, instrument platform 104 of convertible percussion cart-platform system 100 can be used separately or together. When use separately, each instrument platform 104 may be operably connected to player platform 106. Alternatively, each instrument platform 104 can be used independently of player platform 106. Although the following disclosure generally describes operation of convertible percussion cart-platform system 100 having two instrument platform 104 and one player platform 106, one skilled in the art will readily recognize that the operation of convertible percussion cart-platform system 100 having a single instrument platform 104 or more than two instrument platform 104 will be substantially similar.

Referring to FIGS. 3-9, first and second instrument platform 104 are joined at tapered ends 128 with swivel joint assemblies 108 in an embodiment. Player platform 106 may also be hingedly attached to one of instrument platforms 104 proximal to tapering edges 130. Latch 118 may be used to secure player platform 106 in a vertical position, as depicted in FIGS. 3-17. Referring to FIGS. 6 and 10-13, arm of latch 118 is positioned such that a brace extends along lower stage surface 172 and is received by latch bracket 166 and extender extends along lower deck surface 122. In this manner, player platform 106 can be substantially secured a vertical position. Generally, when player platform 106 is positioned in the vertical position, the plane defined by player platform 106 is substantially perpendicular to the planer defined by deck portion 110 to which player platform 106 is operably connected.

Figure 4:
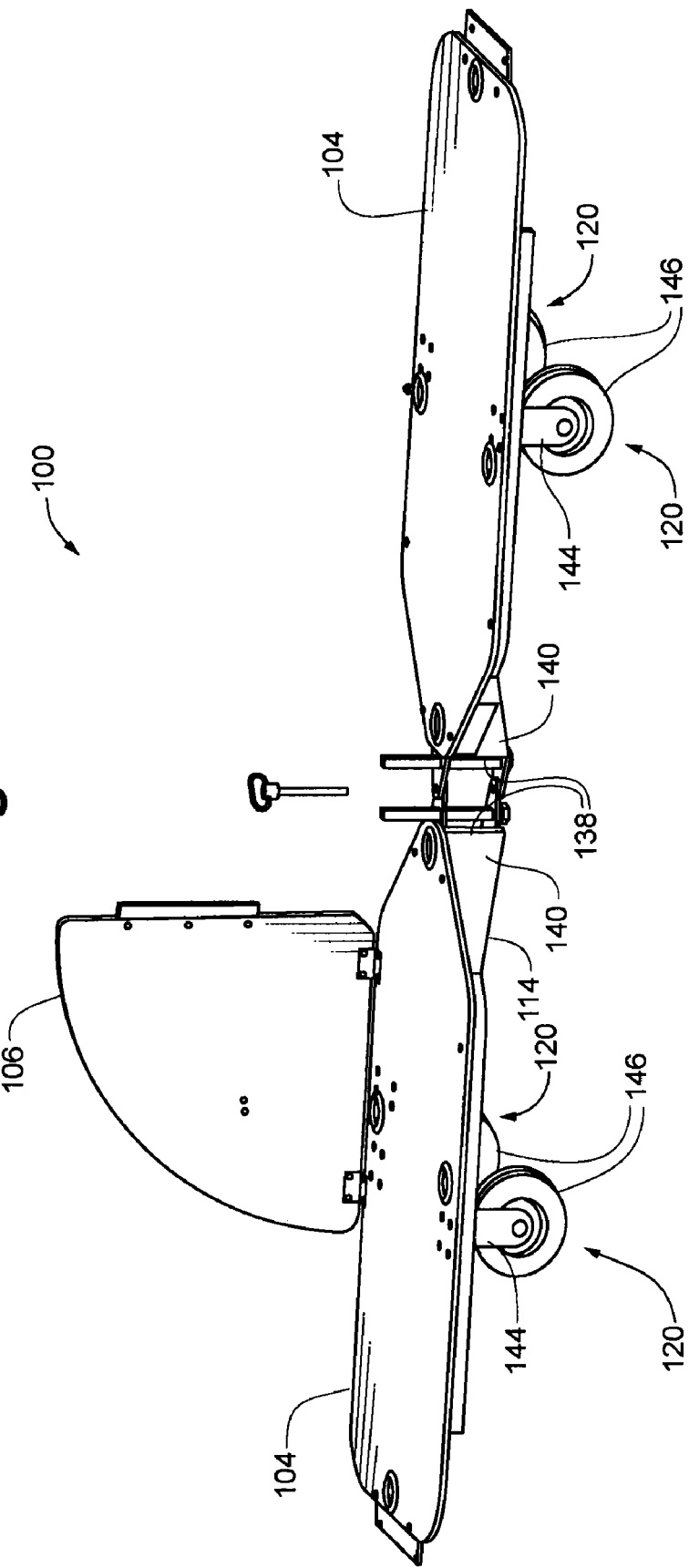
FIG. 4 is a partially exploded rear perspective view of a convertible percussion cart-platform system according to an embodiment of the present invention in a transportation position.
Figure 5:
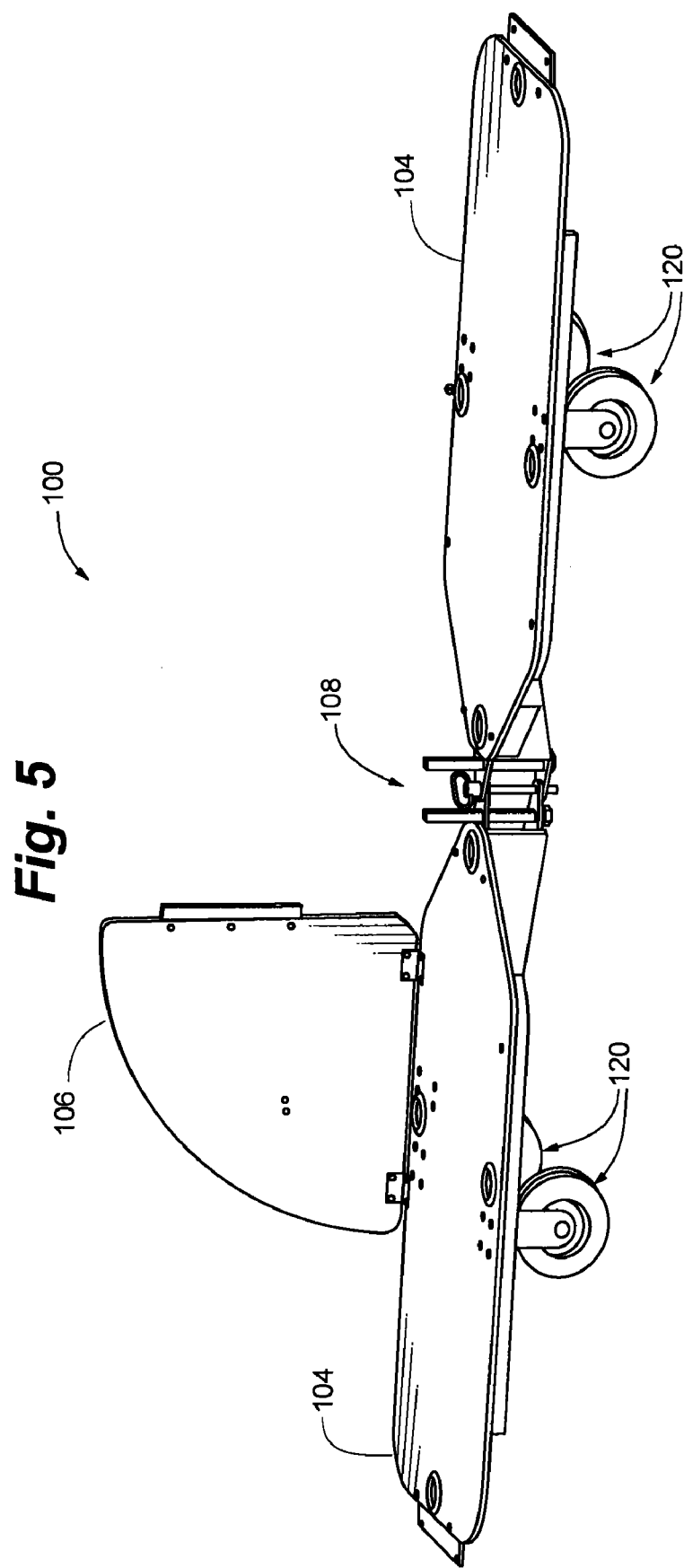
FIG. 5 is a rear perspective view of a convertible percussion cart-platform system according to an embodiment of the present invention in a transportation position.
Figure 6:
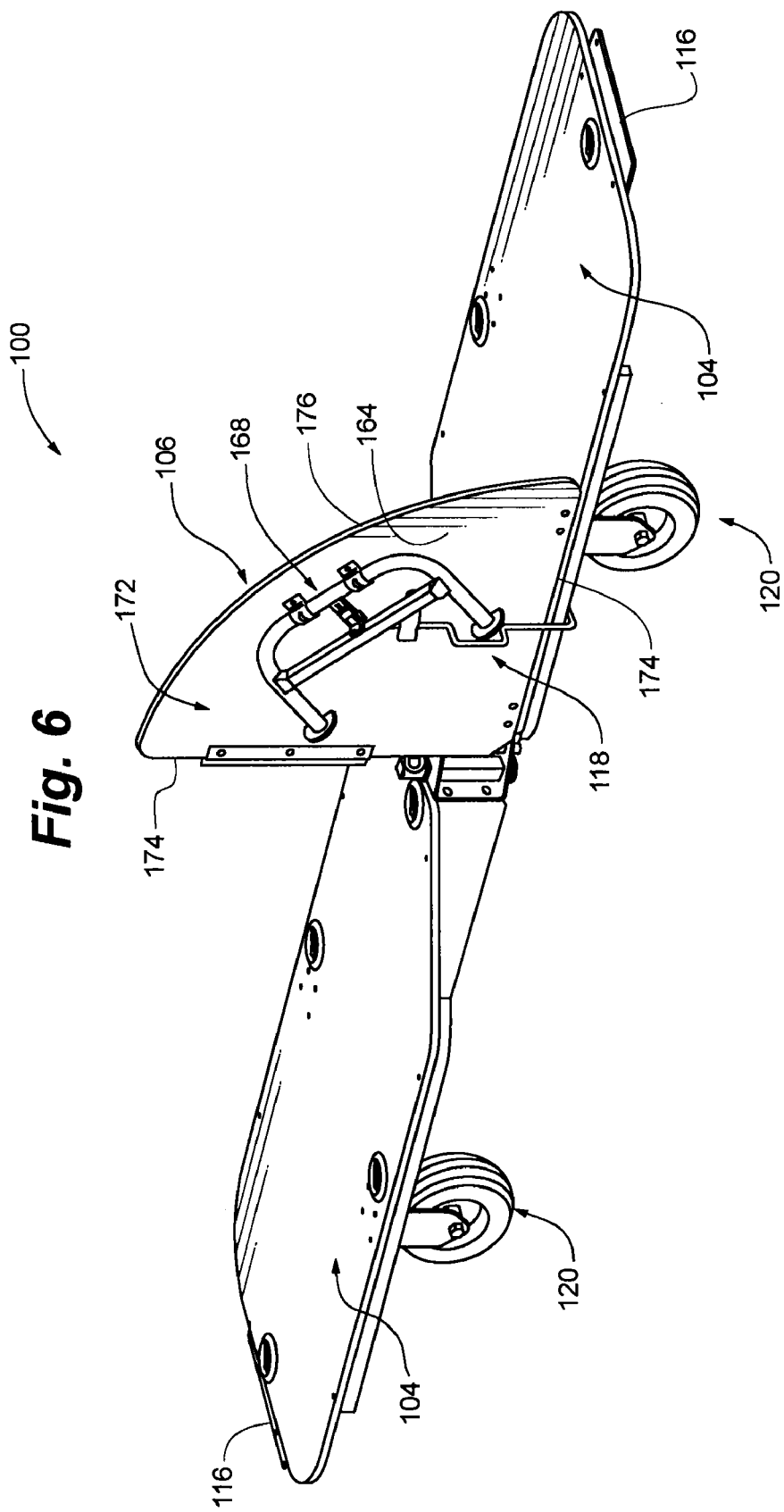
FIG. 6 is a front perspective view of a convertible percussion cart-platform system according to an embodiment of the present invention in a transportation position.
Figure 10:
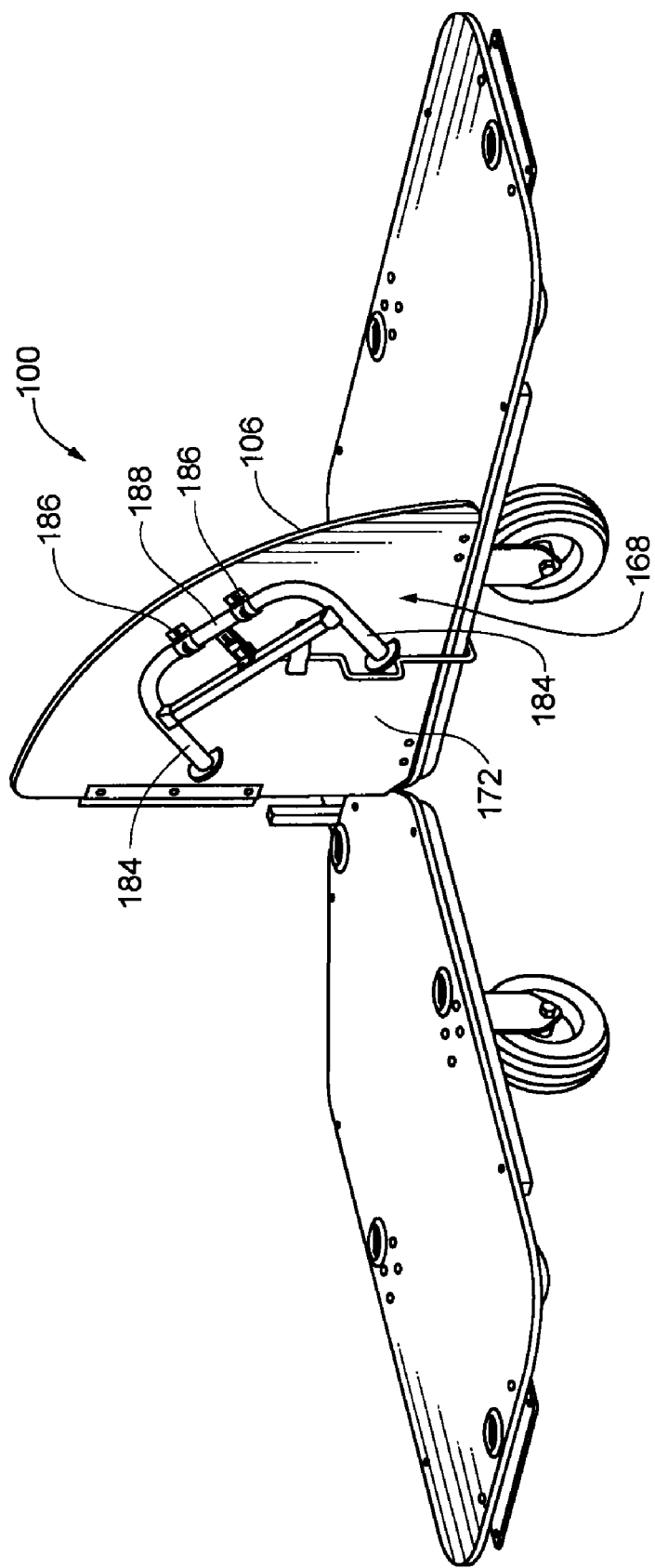
FIG. 10 is a front perspective view of a convertible percussion cart-platform system according to an embodiment of the present invention in an intermediate position
Figure 13:
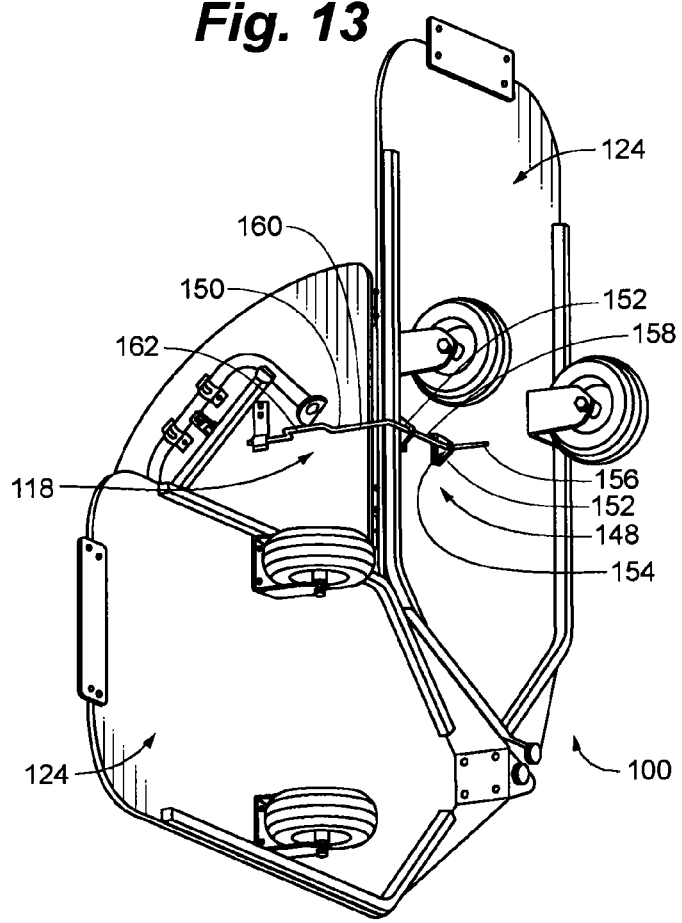
FIG. 13 is a bottom perspective view of a convertible percussion cart-platform system according to an embodiment of the present invention in an intermediate position.
Figure 14:
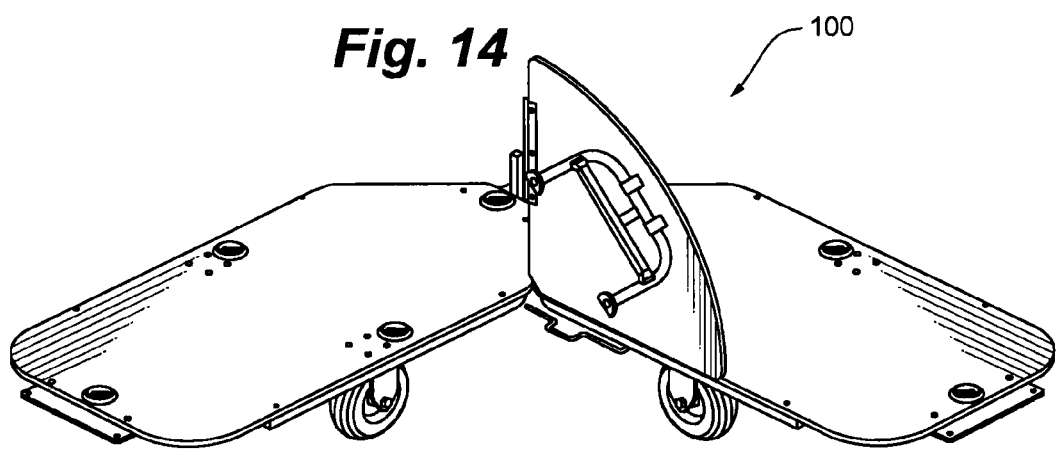
FIG. 14 is a front perspective view of a convertible percussion cart-platform system according to an embodiment of the present invention in an intermediate position.
Figure 17:
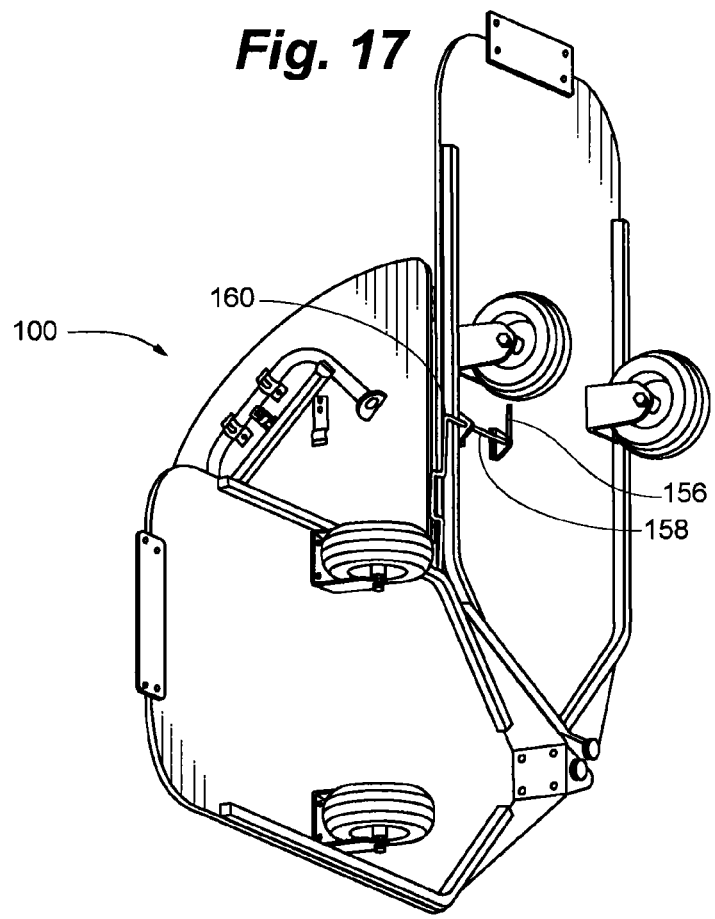
FIG. 17 is a bottom perspective view of a convertible percussion cart-platform system according to an embodiment of the present invention in an intermediate position.

In an embodiment, deck portions 110 of convertible percussion cart-platform system can be joined by operably connecting pivot brackets 192 of swivel joint assembly 108. Referring to FIG. 4, pin apertures 202 are aligned and pin pivot 194 is inserted through pin apertures 202. When first and second deck portions 110 are positioned so that wheel assemblies 120 are substantially aligned, as depicted in FIGS. 5-6 and 8-9, convertible percussion cart-platform system 100 is in a transportation position. In the transportation position, support legs 184 are generally in a lifted position such that there is ample clearance between 220 and the terrain of the performance location. By connecting tow device 142 or vehicle to hitch 116, convertible percussion cart-platform system can be transported between various locations in the transportation position.

Although a user can position timpani-like percussion instruments 102 upon deck portions 110 of instrument platforms 104 as desired, in an embodiment, timpani-like percussion instruments 102 are placed upon deck portions 110 after instrument platforms 104 have been connected with swivel joint assembly 108. In this manner, the weight of timpani-like percussion instruments 102 will not cause deck portions 110 to rotate about wheel assemblies 120. Timpani-like percussion instruments 102 can be secured to upper deck surface 122 using tie-downs rings and tethers as depicted in FIG. 1.

Once transported to a desired location, convertible percussion cart-platform system can be converted into a performance position. In the performance position, convertible percussion cart-platform system presents the player platform and timpani-like percussion instruments 102 in a manner that substantially facilitates playing of the instruments 102 by a performer. Referring to FIGS. 8-13, one of or both instrument platforms 104 are pivoted about pivot axis A-A. In generally, the range of pivot motion of instrument platforms 104 is defined by angle θ. For example, as angle θ increases, the range of pivot motion generally decreases. Similarly, as angle θ decreases, the range of pivot motion generally increases. In an embodiment, the angled positing of instrument platforms 104 is defined by tapering edges 130. In particular, buttressing of tapering edges 130 determines placement of instrument platforms 104 in the performance position, as depicted in FIG. 18. In another embodiment, the angled positioning of instrument platforms 104 is defined by buttressing plates 140.

Player platform can then be folded down into a horizontal position, as depicted in FIGS. 18-36. In the horizontal position, stage portion is substantially co-planar with deck portion 110. In positioning player platform into the horizontal position, handle of latch can be manipulated so that brace is disengaged from latch bracket and arm is rotated toward upper deck surface 122, as depicted in FIGS. 14-17. Grasper may also be used facilitate the positioning of arm. Platform stabilizer can also be manipulated so that support legs are oriented substantially perpendicular to the lower deck surface 122. As stage portion is brought into horizontal position, slit of securing plate is brought over keeper. Keeper can then be rotated so as to substantially secure player platform in place in relation to instrument platform 104. To provide additional stability to convertible percussion cart-platform system, feet 220 of pivot stabilizer can be urged through stabilizer apertures so as the contact the terrain of performance location.

What is claimed is:

1. A convertible cart-platform system comprising:
a first instrument platform presenting a top surface and a bottom surface and having a first pair of spaced-apart wheels coupled to the bottom surface;
a second instrument platform presenting a top surface and a bottom surface and having a second pair of spaced-apart wheels coupled to the bottom surface;
a coupling mechanism operably, pivotally coupling the first and second instrument platforms, the first and second instrument platforms shiftable between a performance position and a transport position; and
a player platform shiftable between a folded position wherein the player platform is clear of the second instrument platform and an unfolded position wherein the player platform is coupleable to the second instrument platform.

2. The convertible cart-platform system of claim 1, further comprising a support structure coupled to the player platform and configured to engage a surface supporting the convertible cart-platform system when the player platform is in the unfolded position.

3. The convertible cart-platform system of claim 2, wherein the player platform is coupled to the first instrument platform with a hinge.

4. The convertible cart-platform system of claim 3, further comprising a second support structure coupled to the coupling mechanism and configured to engage the surface supporting the convertible cart-platform.

5. The convertible cart-platform system of claim of claim 4, wherein the second support structure comprises first and second support legs, each of the first and second support legs shiftable between a raised position and a lowered positioned for stabilizing the respective first and second instrument platforms.

6. The convertible cart-platform system of claim 1, wherein each of the first and second instrument platforms comprises a substantially wedge-shaped end, the substantially wedge-shaped ends defining a range of rotation of the first and second instrument platform between the transport and performance positions.

7. The convertible cart-platform system of claim 1, wherein the range of rotation is approximately ninety degrees.

8. The convertible cart-platform system of claim 1, wherein the convertible instrument-cart platform is manually shiftable between the transport and performance positions.

9. The convertible cart-platform system of claim 1, wherein the performance platform can support a user when positioned in the flat position.

10. The convertible cart-platform system of claim 9, wherein each of the first and second instrument platforms is configured to support at least a pair of percussion instruments.

11. The convertible cart-platform system of claim 10, wherein, each of percussion instruments is playable by the user when the first and second instrument platforms are in the performance position.

12. The convertible cart-platform system of claim 1, wherein the coupling mechanism comprises a first bracket coupled to the first instrument platform, and a second bracket coupled to the second instrument platform, and coupling pin for coupling the first and second brackets.

13. The convertible cart-platform system of claim 12, further comprising a locking mechanism for securing the coupling pin to the first and second brackets.

14. A method of positioning a plurality of percussion instruments supported above a surface, the method comprising:
coupling a first instrument platform to a second instrument platform;
supporting a first of the plurality of percussion instruments with the first instrument platform;
supporting a second of the plurality of percussion instruments with the second instrument platform;
shifting the first and second instrument platforms from a transport position into a performance position, shifting a player platform from a folded position wherein the player platform is clear of the second instrument platform to an unfolded position wherein the player platform is coupleable to the second instrument platform and wherein shifting the player platform from a folded position to an unfolded position comprises hingedly rotating the player platform with respect to the first instrument platform.

15. The method of claim 14, further comprising:
coupling the player platform to the second instrument platform.

* * * * *